INVENTOR.
JAMES E RAU

BY Howard A. Silber

ATTORNEY

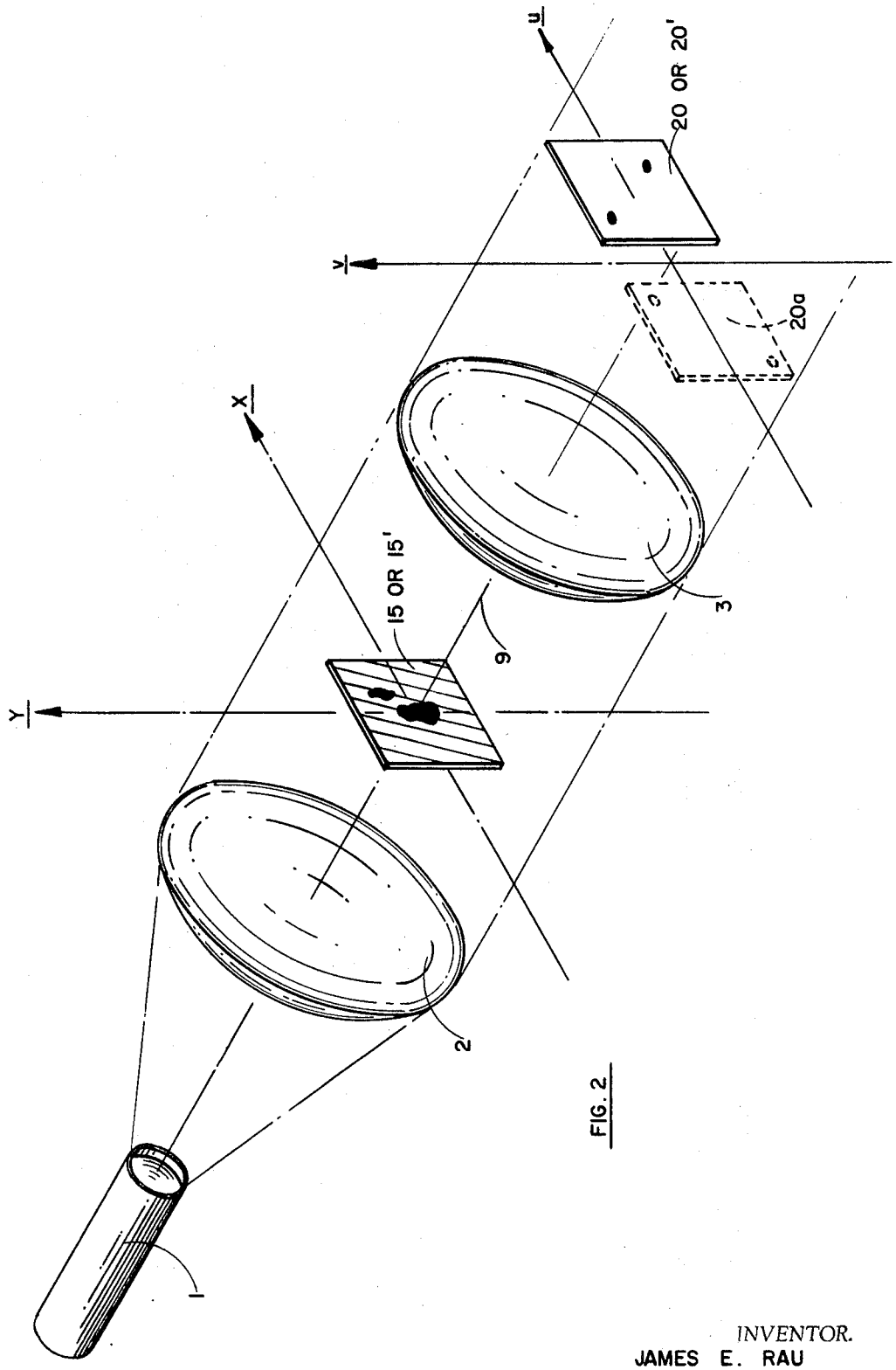

July 7, 1970  J. E. RAU  3,519,992

PHOTOINTERPRETATION SYSTEM

Filed Aug. 10, 1966  9 Sheets-Sheet 3

*INVENTOR.*
JAMES E. RAU

BY Howard A. Silber

ATTORNEY

INVENTOR.
JAMES E. RAU

July 7, 1970  J. E. RAU  3,519,992

PHOTOINTERPRETATION SYSTEM

Filed Aug. 10, 1966  9 Sheets-Sheet 5

*INVENTOR.*
JAMES E. RAU

BY Howard A. Silber

ATTORNEY

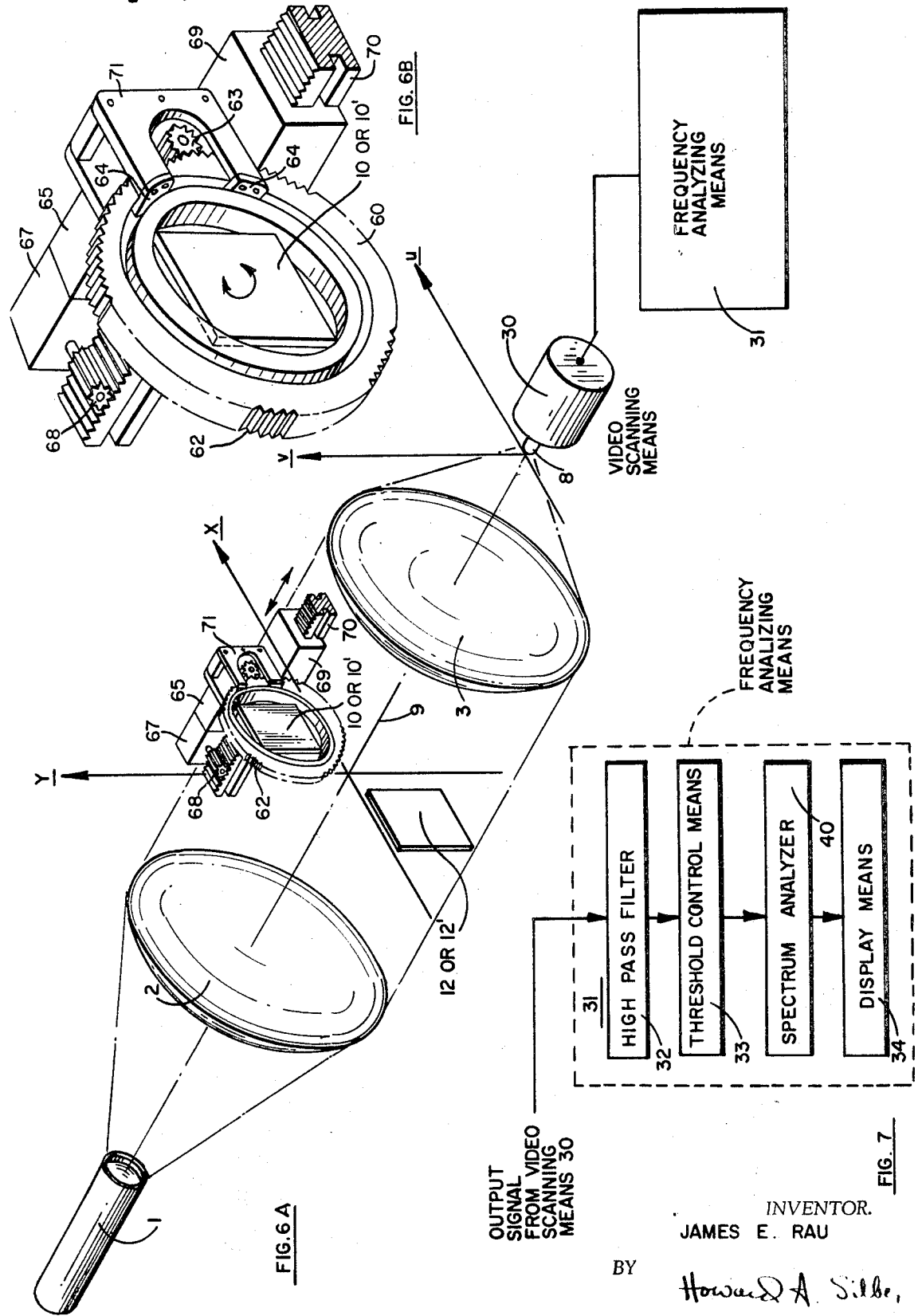

July 7, 1970     J. E. RAU     3,519,992

PHOTOINTERPRETATION SYSTEM

Filed Aug. 10, 1966     9 Sheets-Sheet 7 t = TIME OF ONE FRAME OF VIDEO SCANNING MEANS 30

*INVENTOR.*
JAMES E. RAU

BY Howard A. Silber

ATTORNEY

United States Patent Office 3,519,992
Patented July 7, 1970

---

3,519,992
PHOTOINTERPRETATION SYSTEM
James E. Rau, Stamford, Conn., assignor to North American Rockwell Corporation, a corporation of Delaware
Filed Aug. 10, 1966, Ser. No. 571,627
Int. Cl. G02b 27/00; G06k 9/08
U.S. Cl. 340—146.3      5 Claims

ABSTRACT OF THE DISCLOSURE

The invention is directed to a photointerpretation system for comparing a first transparency having images thereon comprising a reference transparency having a desired image thereon which desired image is to be compared with a first transparency which may or may not have a similar image thereon for purposes of determining if such an image is in fact on the first transparency. The system is comprised of a means for coherently illuminating and mutually projecting images of both transparencies, with optical transforming means being concomitantly illuminated by the coherent illuminating means to project a transformed image to the optical transforming means output focal plane to create an interference pattern. An image recording means is provided to record the interference pattern of the focal plane and to provide an output signal indicative of the recorded image. A spatial frequency analyzing means receives the output from the image recording means and determines the presence or absence of a preselected range of spatial frequencies in the output signal which presence indicates a match of the images from the reference and first transparency thereby indicating that the pattern object or image that was displayed by the reference transparency exists in the first transparency.

---

This invention relates to a photointerpretation system. More specifically the invention relates to a system utilizing optical cross-correlation techniques to accomplish rapid evaluation of a photograph either to determine the presence of a specific shape or target of interest in that photograph, or to determine whether differences exist between that and another similar photograph.

Interpretation of photographs to determine whether a specific shape or image is contained therein generally requires visual inspection of each photograph by a trained photointerpretation specialist. This can be a time consuming task, particularly where aerial reconnaissance pictures are involved, because of the large number of such photographs obtained on a single flight. Further, operator inspection of each photograph is subject to inaccuracies or errors reflecting the difficulty in distinguishing the target of interest from other images differing only slightly in form, or because the image of interest may be partially obscured by other objects in the photograph. Moreover, the results of such operator inspection may vary between operators due to differences in skill between them, and may be non-uniform for a given operator due to operator fatigue, lack of motivation, etc.

Similar limitations arise in many situations where one desires to know whether a specific image is present in a random spatial distribution. Some examples of these situations include determination of whether a specific face is present in a photograph of a crowd; whether a specific aircraft or weapon is present in a photograph of an airfield or ordnance depot; whether a specific stellar configuration is evident in a photograph of a random area of the sky; whether a specific symbol is present in a random assortment, as, e.g., whether a specific Chinese character is present in a page of calligraphy.

Another closely related problem is the comparison of two somewhat similar photographs for differences. This ability would be useful in applications wherein a large number of photographs must be compared with a reference image to determine possible identity. Examples of this application include searching a file of fingerprints or sonograms to determine which ones match a sample, and comparison of reconnaissance photographs of a target area before and after an attack mission to determine whether the target has in fact been damaged. Difference detection also can be used to identify characters in a page of text.

While most shape recognition applications now require visual photointerpretation, some mechanization schemes have been attempted. For example, computer techniques exist for scanning an image, digitalizing the gray tones of each small area of the photograph, and performing graphical analyses of the resultant stored digital matrix to determine if specific configurations are present in the original spatial distribution. This technique requires a digital computer of considerable storage capacity and, depending on the complexity of the images involved, may require considerable machine time to perform the analyses. Performance is limited by the resolution capability of the video equipment used to scan the photograph to be analyzed.

Earlier image recognition techniques using coherent light, such as the experiment described by Vander Lugt (IEEE Transactions on Information Theory, vol. 10, page 139 (1964)). Require the production of a photographic spatial filter corresponding to the complex spatial Fourier transform of the image being sought. This results in a two step operation to accomplish shape recognition. First the filter must be produced, then the photograph to be studied must be optically transformed through this filter. A new filter must be produced for each new shape being sought. Morever, once the filter is constructed the operator has no control over the parameters of the filter, such as its spatial bandwidth, an important factor for shape recognition when the target is partially obscured or when variations in background noise or clutter are a possibility.

The photointerpretation system which is the subject of this invention facilitates rapid comparison of a reference pattern with a second pattern or photograph to be evaluated. To accomplish this, the two patterns to be compared are illuminated with coherent light and projected, using e.g. a spherical lens, to form an image in the output focal plane of the lens. This image contains a Fraunhofer interference pattern which may include one or more sets of fringes. By analyzing the fringe spacings (i.e. spatial frequencies) present, a determination may be made of whether, and at what location, the shape being sought was present in the evaluated photograph.

It is therefore an object of the invention to provide a photointerpretation system capable of determining whether, and at which location, a specific shape or target of interest is present in a photograph regardless of the orientation, location, or number of times the shape or target of interest appears in the photograph.

It is another object of the invention to provide a photointerpretation system capable of determining the presence of a shape in a random spatial distribution even though the target of interest is of a different size than the reference shape with which it is being compared.

Still another object of the invention is to provide a photointerpretation system capable of detecting the presence of a target of interest in a random spatial distribution even though the target is partially obscured by other objects.

A further object of the invention is to provide a dynamic image comparison system capable of determining whether differences exist between two similar photographs.

It is another object of the invention to provide a system employing coherent illumination to accomplish optical cross-correlation of two spatial distributions, without the necessity for first producing a spatial filter.

Further objects and features of the invention will become apparent from the following description and drawings which are utilized for illustrative purposes only.

FIG. 2 shows a schematic view of an optical arrangement for transforming the record produced by the setup of FIG. 1.

Figure 1:
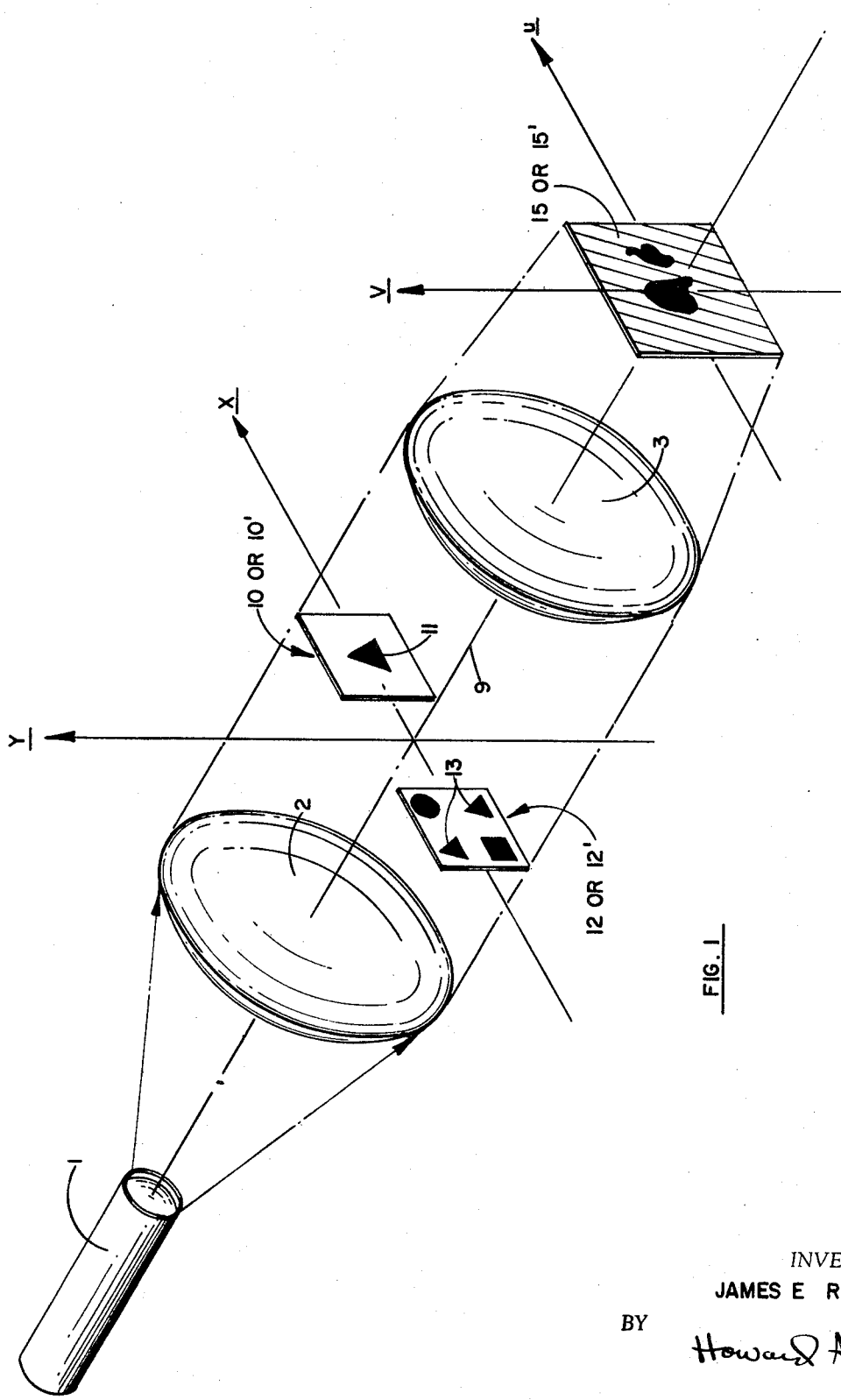
FIG. 1 shows a schematic view of an optical arrangement useful for partially accomplishing the objectives of the subject invention.
Figure 3A:
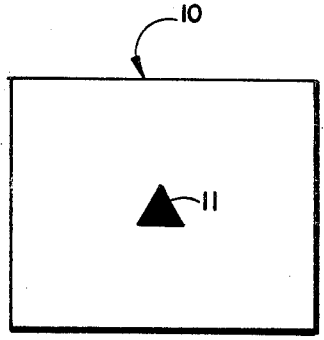
FIGS. 3A and 3B show respectively a typical reference shape and a typical photograph in which the reference shape of FIG. 3A is sought to be recognized.
Figure 3B:
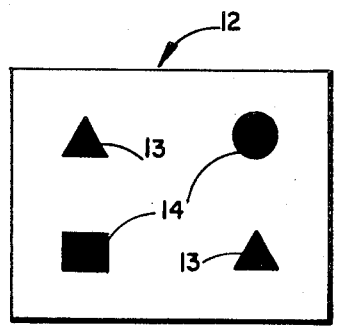
Figure 3C:
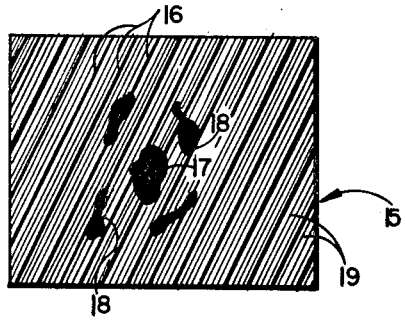
Figure 3D:
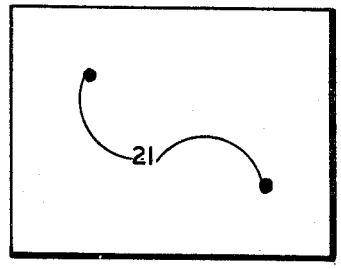

FIGS. 3C and 3D respectively illustrate a typical record obtained with the optical arrangement for FIG. 1, and the transformed record obtained with the apparatus of FIG. 2.

Figure 3E:
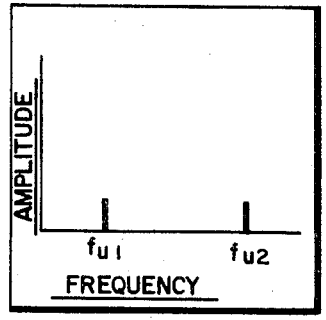
Figure 3F:
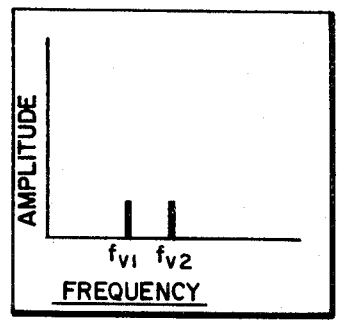

FIGS. 3E and 3F show typical oscillogram displays indicating respectively the coordinates of targets of interest detected in a photograph being evaluated using the system depicted in FIG. 6A.

Figure 4:
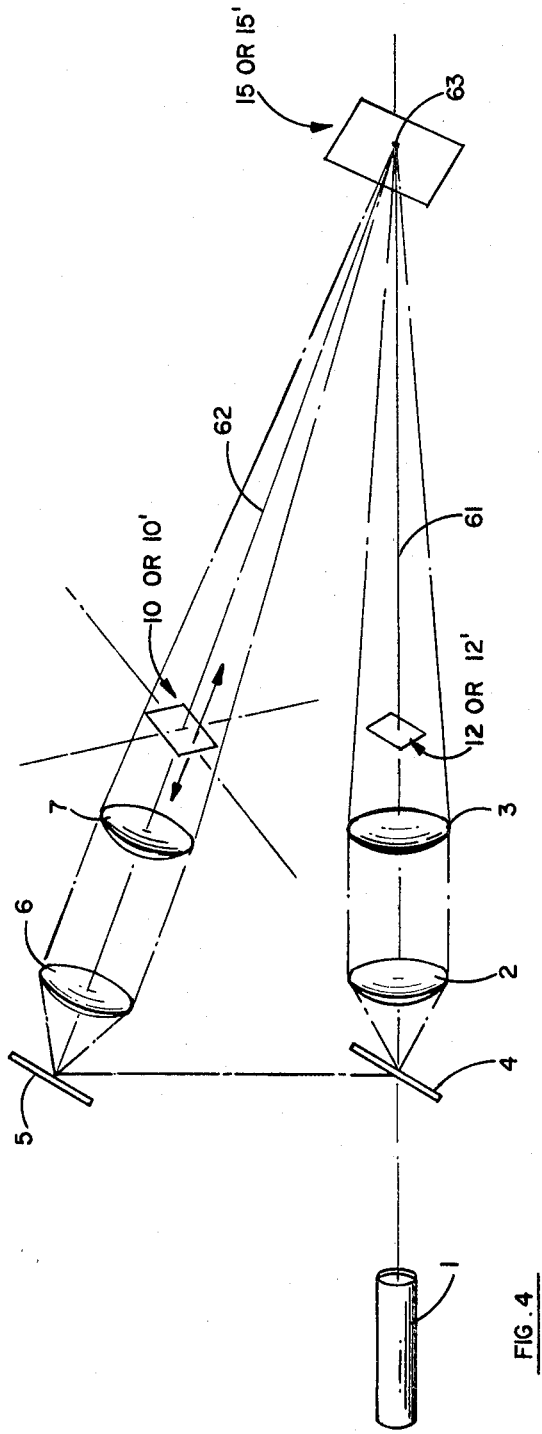

FIG. 4 illustrates an optical arrangement for producing a record when the targets of interest are of a different size or scale than the reference shape.

Figure 5A:
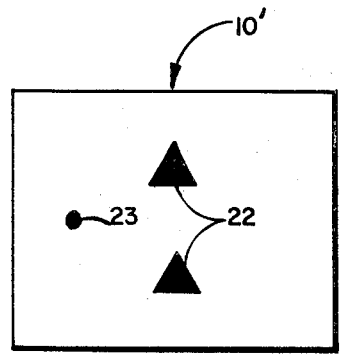
Figure 5B:
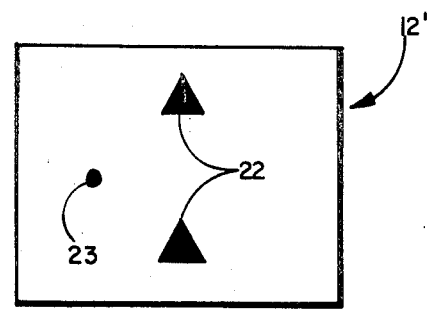
Figure 5C:
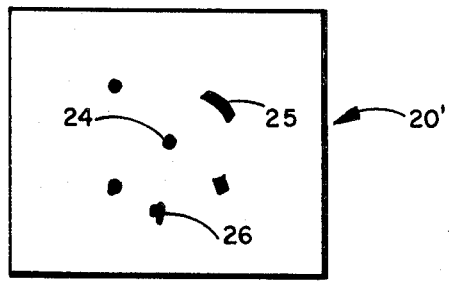

FIGS. 5A and 5B respectively show two typical somewhat similar photographs to be compared for differences; FIG. 5C shows the general appearance of the transformed record obtained with the apparatus of FIG. 2.

FIG. 6A schematically illustrates a complete shape recognition system embodying the inventive concept and including electronic image recording and frequency analyzing apparatus.

FIG. 6B illustrates a mechanical arrangement for displacing and rotating a transparency in order to compensate for scale differences and differences in angular orientation, respectively.

FIG. 7 shows a block diagram of one embodiment of the frequency analyzing apparatus shown in FIG. 6A.

Figure 8:
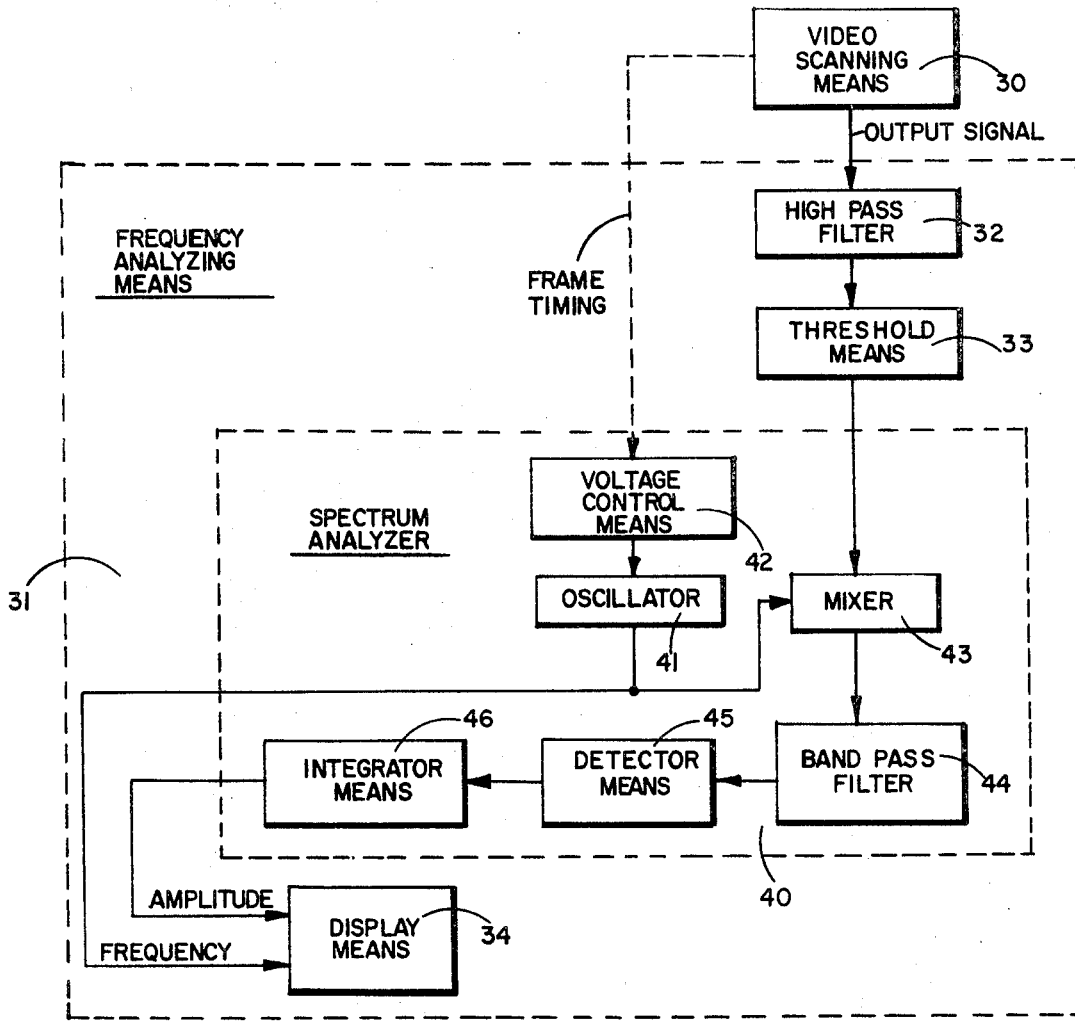

FIG. 8 shows a block diagram of one embodiment of a spectrum analyzer, a possible component of the frequency analyzing apparatus shown in FIG. 6A.

Figure 9:
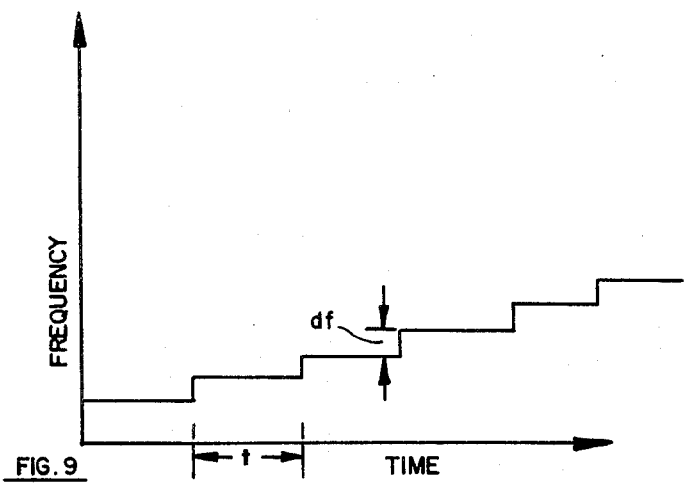

FIG. 9 shows a time history of the frequency of the oscillator utilized with the spectrum analyzer embodiment shown in FIG. 8.

Figure 10:
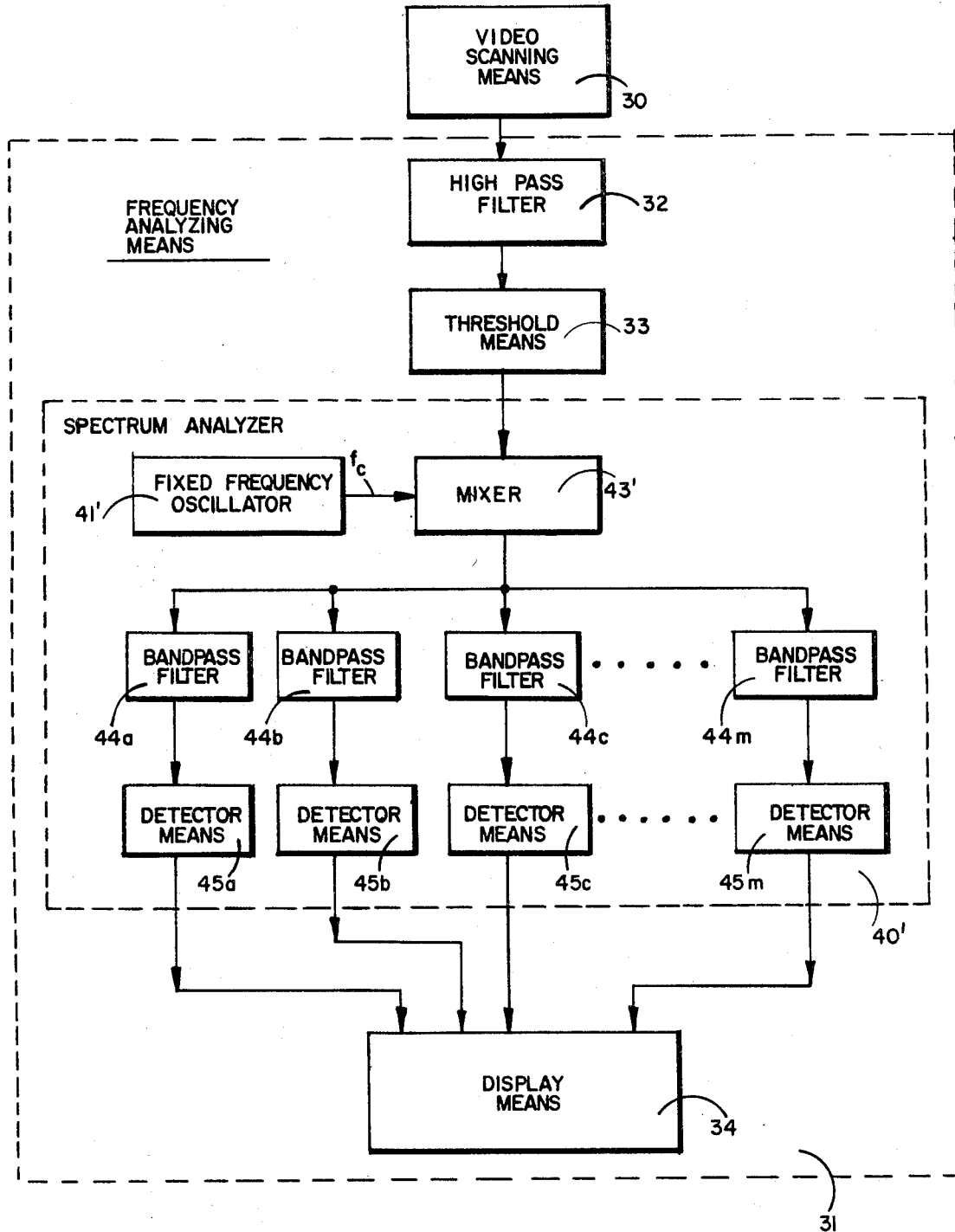

FIG. 10 shows a block diagram of another embodiment of a spectrum analyzer.

Figure 11:
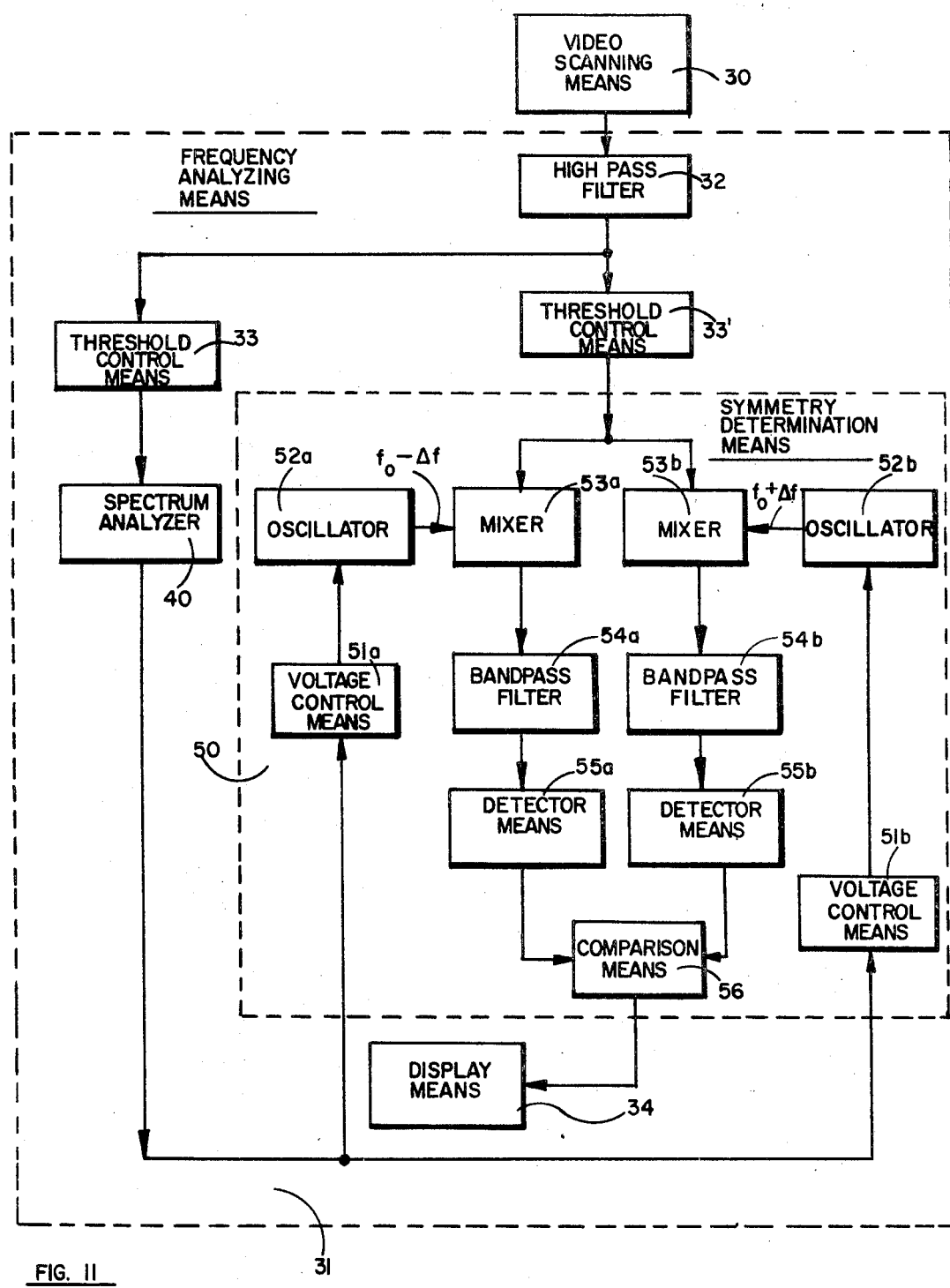

FIG. 11 shows a block diagram of an embodiment of the frequency analyzing means of FIG. 6 including spectrum symmetry determination apparatus useful for comparing two somewhat similar photographs for differences.

The photointerpretation system of the subject invention utilizes two photographic transparencies, which may be either positives or negatives, to achieve dynamic shape recognition. One transparency may contain the photograph or random spatial distribution to be evaluated, the other may contain a photograph of the reference shape or image which is sought to be recognized in the photograph being evaluated. To accomplish image difference detection, two transparencies containing somewhat similar photographs are compared.

Alternately, one or both of the photographic transparencies may be replaced by the surface of an electro-optic display device on which a random pattern has been generated.

Referring now to FIG. 1, there is shown schematically an optical arrangement for partially accomplishing shape recognition or difference detection. Specifically, a source of spatially coherent light, which may be in the infrared, visible, or ultraviolet region, is used. This light source, comprising LASER 1 and collimating lens 2, simultaneously illuminates transparency 10 comprising the reference shape 11 to be recognized, and transparency 12 containing the photograph to be evaluated. As shown in FIG. 1, the transparencies 10 and 12 both may be located in the input or front focal plane of optical transforming means 3, which in the preferred embodiment is a spherical lens. Alternately, the transparencies may be placed on the output side of optical transforming means 3, nearer to optical transforming means 3 than to its output focal plane.

The arrangement of FIG. 1 is used to produce an image in the output focal plane of lens 3, which image contains a Fraunhofer interference pattern. The image may be recovered by exposing film 15 in the output focal plane of lens 3 to produce a photographic record or third transparency. Alternately, an additional optical arrangement well known to those skilled in the art may be used to project the image formed in the output focal plane of lens 3 to another location, and film 15 may be exposed at this location. This third transparency contains the heterodyne of the spatial spectra of transparencies 10 and 12.

While FIG. 1 illustrates the use of a spherical lens 3, equivalent system operation can be achieved using other optical transforming means well known to those skilled in the art, such as a spherical mirror, parabolic mirror, or Fresnel lens. In addition, parabolic lenses other than spherical also may be used to achieve appropriate optical transformation.

Referring to FIG. 3A, there is shown a typical transparency or pattern 10 containing an image or reference shape 11, the presence of which is to be sought in the random spatial distribution of transparency or pattern 12, shown in FIG. 3B. Note that photograph 12 contains, in this example, two targets of interest 13, each of which has a shape, size and angular orientation identical to that of reference shape 11. Photograph 12 also contains other objects 14 which do not have the shape to be recognized; such other objects 14 constitute noise or clutter in the photograph to be evaluated.

FIG. 3C shows an example of a typical record obtained using the optical arrangement of FIG. 1; it is shown for illustration purposes only and does not necessarily correspond to that record which would actually be obtained were transparencies corresponding to those of FIGS. 3A and 3B used.

Record 15 has several significant features. First, should one or more targets 13 corresponding to the reference shape 11 being sought be present in the photograph being evaluated 12, the light striking film record 15 from the targets of interest 13 will combine with the light from the reference image 11 in transparency 10 to form intense Fraunhofer interference fringes 16 over most of record 15. These fringes 16 may be more intense over certain areas of record 15 than other areas, such intense areas are indicated generally by regions 18 in FIG. 3C.

If only one target of interest 13 is present in the random spatial distribution 12, the fringes 16 all will have the same fringe spacing or spatial frequency. If more than one target of interest 13 is present, there will be a set of fringes corresponding to each such target, each set having a unique spacing or spatial frequency. These frequencies are related to the wavelength of the illumination, the focal length of transforming lens 3, and to the distance between the reference image 11 and the targets 13 in the place where transparencies 10 and 12 are situated (see FIG. 1). Thus, fringes 16 represent narrow band spatial modulation of the coherent illumination at frequencies indicative of the locations of targets of interest 13 in photograph 12.

A second feature of record 15 is the presence of additional sets of fringes 19 which result from the combination of light which has passed through reference transparency 10 with light which is transmitted by the background images 14 in transparency 12. These interference fringes 19 have fringe spacings (i.e., spatial frequencies) different from those of interference fringes 16 and moreover are of significantly lower amplitude, thus requiring longer exposure time to become apparent on film record 15. Fringes 19 represent dispersed spatial modulation of the coherent illumination due to background images 14.

Another significant feature of record 15 is a very intense central area 17, whose center coincides with optical axis 9, which results in part from those portions of the light passing through transparencies 10 and 12 which are not so related as to produce interference fringes. The central area 17 also results from exposure to light which does not pass through either transparency 10 or 12, for example, that light which travels parallel to optical axis 9 between transparencies 10 and 12, as shown in FIG. 1. As indicated in FIG. 3C, the central area 17 is so intense that the fringes 16 are not visible in this region.

To determine the spatial frequencies present in film record 15, the fringes 16 therein may be considered as forming a diffraction grating. When light is transmitted through such a grating, a diffraction pattern is generated, the maximum intensity regions of which are located at positions related to the spacing of the grating, i.e., to the fringe spacing in film record 15. Since the spatial frequencies present in record 15 are related to the locations of recognized shapes 13 in the photograph 12 being evaluated, the diffraction pattern formed using film record 15 as a grating also is related to these locations.

The apparatus of FIG. 2 may be used to analyze film record 15. Referring to FIG. 2, there is shown a source of coherent light including a LASER 1 and a collimating lens 2 which is used to illuminate film record 15. In the preferred embodiment of this system, film record 15 is located in the front or input focal plane of optical transforming means 3 which, preferentially, may be a spherical lens.

As described above, the fringes of record 15 act in a manner analogous to a transmission grating and produce a diffraction pattern 20 in the output focal plane of optical transforming means 3. (A symmetric pattern of opposite sense also would be produced, as shown at 20a in FIG. 2.)

If a photographic film were exposed in the output focal plane of optical transforming means 3 in FIG. 2, an image having the general appearance shown in FIG. 3D would result. Specifically, diffraction maxima 21 would be evident at locations corresponding to positions in the photograph being evaluated 12 at which targets 13 corresponding to the reference shape 11 being sought are present. Thus spatial frequency analysis of record 15 has been achieved.

FIG. 3D also illustrates another aspect of the subject invention. Note that, as best illustrated in FIG. 1, the two targets of interest 13 are located at different y coordinate positions than the reference shape 11. As a result, the fringes 16 in record 15 are not parallel to the v-axis, but rather are at some angle with respect to that axis; this is also illustrated in FIG. 3C. When film record 15 is analyzed using the optical gating technique of FIG. 2, the oblique fringes 16 result in the diffraction maxima 20 being at different v-axis locations. Thus these maxima 20 indicate both the x- and y-axis locations of the targets of interest 13 in the photograph 12 being evaluated.

FIGS. 3E and 3F are discussed below in conjunction with the description of the embodiment of the invention shown in FIG. 6A.

As illustrated in FIGS. 3A and 3B, the targets of interest 13 each have the same angular orientation as reference shape 11. If, however, a target of interest 13 had an angular orientation different from that of the reference shape 11, shape recognition would not be achieved. Recognition of a target of interest 13 regardless of its angular orientation may be accomplished, however, by performing successive searches while incrementally rotating either reference shape 10 or photograph 12 through 360° relative to the other. While this is somewhat unwieldly when using the photographic analysis embodiment of FIG. 2, it presents no difficulty when employing the embodiment of the photointerpretation system described below in conjunction with FIG. 6.

Should the target of interest 13 in the photograph 12 being evaluated have a size or scale different from that of reference shape 11, shape recognition would not be accomplished using the procedure described above. However, recognition of such a different size target may be achieved by performing successive searches with transparencies 10 and 12 located sequentially at relatively different distances from the optical transforming means employed. For example, the optical arrangement of FIG. 4 could be employed for this purpose.

As shown in FIG. 4, coherent light from LASER 1 is split and reflected by beam splitter 4 and mirror 5 into two-intersecting optical paths parallel respectively to optical axes 61 and 62. The portion of the light transmitted by beam splitter 4 goes through collimating lens 2, optical transforming means 3, and transparency 12 containing the photograph to be evaluated. The component of light reflected by beam splitter 4 in turn is reflected by mirror 5, and transverses collimating lens 6, optical transforming means 7 and transparency 10. Transforming means 3 and 7, both of which preferably are spherical lenses of identical focal length, but which may be lenses of other configurations or parabolic mirrors, are located such that their output focal planes coincide with the intersection point 63 of optical axes 61 and 62.

The Fraunhofer interference image 15 appears in a plane coinciding with intersection point 63 and adjacent the output focal planes of optical transforming means 3 and 7. The photograph 12 to be evaluated is maintained in a fixed position at a point closer to lens 3 than to intersection point 63. Transparency 10, containing the reference image 11, is mounted such that its linear position along optical axis 62 between lens 7 and film 15 can be altered. Alternately, the location of transparency 10 may be fixed and transparency 12 mounted to permit linear translation along optical axis 61. Successive searches then may be carried out while incrementally changing the relative location of transparencies 10 and 12 with respect to intersection point 63 to accomplish recognition of targets having sizes or scales different from that of reference shape 11.

An alternate optical arrangement allowing recognition of targets having sizes different from reference shape 11 involves mounting transparencies 10 and 12 on the output side of optical transforming means 3 in the embodiment shown in FIG. 1, with appropriate mounting means to allow motion of one transparency relative to the other along an optical path between optical transforming means 3 and its output focal plane. The successive searches needed to accomplish shape recognition using this system or the optical arrangement of FIG. 4 again may be accomplished expeditiously using the photointerpretation system embodiment having video scanning means and electronic frequency analyzing apparatus, as described below, e.g., in conjunction with FIG. 6A.

Mathematically, what has been achieved using the above techniques may be described as optical cross-correlation of the spatial distribution $f(x, y)$, representing the shape being sought, with the photograph being evaluated. The latter photograph comprises a random spatial distribution $f(x, y) + \eta(x, y)$, where $f(x, y)$ represents a target of interest present in the distribution and $\eta(x, y)$ represents clutter and other background items in the photograph. The symbols $x$ and $y$ refer to coordinates in the plane of transparencies 10 or 12, as shown e.g., in FIG. 1. When a coherently illuminated pattern is projected through a spherical lens or is reflected by a spherical mirror, the output focal plane contains the Fourier transform of the original spatial distribution.

This spatial Fourier transform phenomenon is described by J. E. Rhodes, Jr., in "Analysis and Synthesis of Optical Images," at pages 337 to 343 of the May 1953 issue of the American Journal of Physics, volume 21.

Thus, the amplitude $G(u, v)$ of the light on the output focal plane of spherical lens 3 in FIG. 1 contains the sum of the Fourier transforms $F[f(x, y)]e^{i\beta}1$, representing the amplitude of the light from projected reference shape 11 and $F[f(x,y)]e^{i\beta}2 + F[\eta(x, y)]e^{i\beta}3$, representing the amplitude of the light in projected photograph 12 being evaluated. In each case $\beta_n = k_n u + C_n v$ where $k_n$ and $C_n$ are constants determined by the location of the reference shape 11, target 13 or clutter 14 relative to an optical axis (e.g., to optical axis 9 in FIG. 1).

When the photographic film in the back focal plane of optical transforming means 3 in FIG. 1 is exposed, the density of the resultant film record 15 is approximately proportional to the square of the amplitude of the light striking it. Thus the intensity pattern evident on film record 15 is represented by $$|G(u, v)|^2 = |F[f(x, y)]e^{i\beta}1 + F[\eta(x, y)]e^{i\beta}2 + F[f(x, y)]e^{i\beta}3|^2 \quad (1)$$

wherein the exponentials may be considered to represent sinusoidal functions related to the spatial frequencies present in the Fraunhofer interference image 15. Equation 1 may be expanded as follows:

$$|G(u, v)|^2 = 2F[f(x, y)](F[f(x, y)])^*$$
$$+ F[\eta(x, y)](F[\eta(x, y)])^*$$
$$+ F[f(x, y)](F[f(x, y)])^* e^{i(\beta_3 - \beta_1)} + e^{-i(\beta_3 - \beta_1)}$$
$$+ F[f(x, y)](F[\eta(x, y)])^* e^{i(\beta_1 - \beta_2)} + e^{i(\beta_3 - \beta_2)}$$
$$+ F[\eta(x, y)](F[f(x, y)])^* e^{i(\beta_2 - \beta_1)} + e^{i(\beta_2 - \beta_3)}$$
$$(2)$$

wherein the * symbol indicates the complex conjugate of the quantity within its associated brackets.

The third term of Equation 2 corresponds to the predominant interference pattern present in record 15 and shown in FIG. 3C as fringes 16; the exponentials define the fringe spacing (i.e., spatial frequencies) present. This third term of the expansion is of particular interest because the Fourier transform of $F[f(x, y)]F[f(x, y)]^*$ is equal to the autocorrelation function of $f(x, y)$. (The derivation of this equality is contained at pages 40 to 45 of the text, "The Fourier Transform and Its Applications," by Ron Bracewell, and published by McGraw-Hill Publishing Company, New York, N.Y., in 1965.) Thus, if record 15 now is placed in the front focal plane of optical transforming means 3, as shown in FIG. 2, the image 20 appearing in the output focal plans of optical transforming means 3 contains the Fourier transform of $F[f(x, y)](F[f(x, y)])^*$. That is, transformed record 20 contains the autocorrelation function of $f(x, y)$; or more precisely, the correlation function of $f(x, y)$, the shape 11 to be recognized, and a target 13 of interest $f(x, y)$, present in the photograph 12 being evaluated.

It should be noticed that the desired autocorrelation function appears at two symmetrically opposing positions in the output focal plane of optical transforming means 3 as shown at 20 and 20a in FIG. 2. These positions are determined respectively by the terms $e^{i(\beta_3 - \beta_1)}$ and $e^{-i(\beta_3 - \beta_1)}$ in Equation 2. Since the autocorrelation function at either location completely defines the positions of the recognized targets 13 in the photograph 12 being evaluated, film 20 can be positioned off the optical axis to record only one of the two autocorrelation functions, as shown in FIG. 2.

The first two terms of the expansion of Equation 2 corresponds in part to central areas 17 of record 15 as shown in FIG. 3C. The lack of fringes in this region (neglecting those superimposed on these areas but which result from other terms of Equation 2) is dictated by the absence of exponential components in these two terms. The final two terms in Equation 2 corresponds to the less intense interference fringes 19 in record 15.

Use of optical transforming means 3 other than a spherical lens or mirror results in transformation equations which may differ from Equation 1, but which nevertheless would contain an expansion term analogous the third term of Equation 2. Transformation of this analogous term would permit recovery of the desired autocorrelation function.

When two somewhat similar photographs are to be compared to determine whether differences exist between them, optical arrangements identical to those of FIGS. 1 and 2 may be used. However, instead of using transparencies comprising a reference shape and a random spatial distribution, the transparencies used should contain the two photographs being compared. Examples of such transparencies 10' and 12' are shown in FIGS. 5A and 5B respectively; note that the two photographs each contain two triangles 22 and a circular object 23, but that the spacing between the triangles is different in the two photographs.

A film record 15' produced using the optical arrangement of FIG. 1 in combination with transparencies 10' and 12' (the two photographs to be compared) will have the same general characteristics as shown for record 15 in FIG. 3C. However, interference fringes 19 indicated in FIG. 3C now are of considerable importance, since the symmetry of their spatial frequencies (i.e., fringe spacing) is indicative of the differences between the two photographs being compared.

When two identical photographs 10' and 12' being compared, the situation would be analogous to achieving image recognition when the photograph 12 under evaluation contains a single shape 13 identical to reference shape 11. This would result in a single set of fringes 16 having a spatial frequency $f_0$. The dispersed spatial modulation fringes 19 would have spatial frequencies $f_0 + f_1$ and $f_0 - f_1$, $f_0 + f_2$ and $f_0 - f_2$ etc., where $f_n$ is a small incremental frequency. Further, the fringes corresponding to $f_0 + f_n$ and $f_0 - f_n$ would be of the same amplitude; that is, fringes 19 would be symmetrical.

If, as in the illustrations of FIGS. 5A and 5B the two photographs are not exactly the same, the resultant fringe pattern in record 15' (see FIG. 3C) again would contain a single set of intense fringes 16 at spatial frequency $f_0$. However now the lesser amplitude fringes 19 will not have equal amplitudes at $f_0 + f_n$ and $f_0 - f_n$. Moreover fringes may have spatial frequencies non-symmetrically related to $f_0$; for example, fringe sets 19 may be present at frequencies $f_0 + f_{1a}$ and $f_0 - f_{1b}$ where $f_{1a}$ and $f_{1b}$ are nonequal frequency increments. This non-symmetry indicates that the two photographs 10' and 12' being compared are not identical.

When the film record 15' (obtained using the optical arrangement of FIG. 1 together with transparencies 10' and 12' as shown in FIGS. 5A and 5B respectively) is processed using the apparatus of FIG. 2, the resultant record 20' will resemble that shown in FIG. 5C. Specifically, an intense spot 24 will be surrounded by other less intense markings. Spot 24 corresponds to the image locating spots 20 obtained when shape recognition was being carried out, and results from the diffraction grating effect of fringes 16 in record 15'. The symmetry of the less intense markings surrounding spot 24 are indicative of differences present in the photographs being compared, and result from the nonsymmetrical fringe spacings (i.e., spatial frequencies) of the sets of fringes 19. Note in FIG. 5C that relatively intense area 25 has no symmetrical component on the opposite side of the spot 24. Rather, a less intense area 26 having a different shape, appears at the radially symmetric location. Had the two photographs being compared been identical, the resultant photograph 20' would have exhibited a pattern exactly symmetric about spot 24.

As was the case when image recognition was being accomplished, if the angular orientation of the two photographs 10' and 12' was not the same, consecutive comparisons while rotating one transparency would be required. Similarly, if the two photographs being compared were of different scale, the apparatus of FIG. 4 may be used rather than that of FIG. 1, and consecutive comparisons would be required while moving one of the transparencies along an optical axis.

Although the device of the invention has been described thus far in terms of an optically transformed photographic record, the concept of the invention is not so limited. Rather, the steps of recording the Fraunhofer interference image and analyzing the spatial frequencies present therein may be accomplished alternatively by electronic means, shown more particularly in FIG. 6A.

Referring now to FIG. 6A, there is illustrated a preferred embodiment of the inventive photointerpretation system employing video scanning and electronic spatial frequency analyzing means. Specifically, an optiacl system identical to that of FIG. 1 is shown, however, in place of film 15 of 15', video scanning means 30 such as a standard vidicon or image orthicon camera may be used to detect the record. The vidicon or image orthicon should exhibit nonlinear sensitivity characteristics, and preferentially, its output should be approximately proportional to the square of the amplitude of the incident light. The output signal of video scanning means 30 then would be represented by the expression $G(u, v)_2$ given in Equation 1 or 2.

An opaque mask 8 may be used to prevent the intense light near the optical axis from entering the vidicon camera. This light, which results in the dark central area 17 as shown in FIG. 3C for photographic record 15, has an intensity considerably greater than that of the fringe pattern of interest, and if allowed to enter the vidicon or image orthicon may overload the video scanner and prevent detection of the fringes 16 and 19.

Video scanning means 30 may employ a high resolution television type raster scan, where a complete scan of record 15 comprised a single frame. Blanking, if desired, may be employed during both horizontal and vertical flyback times, using means well known to those skilled in the art.

Recall that if $n$ targets of interest 13 are present in photograph 12 to be evaluated, then $n$ sets of intense fringes 16 will be present in record 15. These $n$ sets of fringes 16 will have $u$-axis spacing $\lambda_{u1}, \lambda_{u2} \ldots \lambda_{un}$ respectively, and $v$-axis spacing $\lambda_v, \lambda_{v2} \ldots \lambda_{vn}$ respectively. The output of video scanning means 30 is a periodic time varying video signal, the spectral content of which (in the frequency domain) represents frequencies $f_{un}$ determined by the spacing $\lambda_{un}$ of the $n$ sets of fringes 16 present in record 15 and by the horizontal sweep rate of the video scanner (which here is assumed to be parallel to the $u$-axis shown in FIG. 6).

$$f_{un} = \frac{\text{horizontal sweep rate (parallel to u-axis)}}{\lambda_{un}} \quad (3)$$

In addition, periodic time varying video signal components corresponding to interference fringes 19 also will be present in the output signal from video scanning means 30. These signals will be of lower amplitude than those signals corresponding to fringes 16, since fringes 19 are of lower optical intensity.

The video output signal from video scanning means 30 also will contain low frequency components which result in part from scanning of the blocked off central area (corresponding generally to central area 17) and of the intense areas 18 of record 15, and in part from the blanking operations.

As noted earlier, the fringe spacing $\lambda_{un}$ is directly related to the separation distance (parallel to the $x$-axis) between the reference image 11 and the $n$th target of interest 13 at the input to the system (e.g., in the front focal plane of lens 3, using the optical arrangement of FIG. 6A). Thus by determining the frequencies $f_{un}$ present in the output signal of video scanner means 30, the $x$-axis locations of targets of interest 13 in the photograph 12 being evaluated may be established.

Either transparency 10' or 12' may be rotated by placing the transparency in a housing 60 which has a stationary gear 62 affixed thereto. Gear 62 is driven by motor 65 through gear 60. Recesses 61 on both faces of housing 60 provide a track for projections 64. Projections 64 are connected to a frame 71 which in turn is affixed to a movable carriage 69. Carriage 69 is mounted on a rack gear frame 70 for motion parallel to the optical axis 9 of the system. A motor 67 drives the carriage 69 along the frame 70 through a drive gear 68. The displacement of the transparency along the frame 70 compensates for the scale difference between the two transparencies. The rotation of housing 60 enables the angular orientation of objects on each of the transparencies to be matched. Motors 65 and 67 may be controlled either by an operation or through electronic circuiting to achieve a maximum match.

As shown in FIG. 6A, frequency analyzing means 31 is employed to determine the frequencies and amplitudes of the signal components present in the output from video scanning means 30. To accomplish this result, frequency analyzing means 30 comprises appropriate electronic circuitry such as that described below in conjunction with FIGS. 7, 8, 10 and 11. This embodiment of the photointerpretation system facilitates both shape recognition and detection of differences between similar photographs.

FIG. 7 shows one embodiment of frequency analyzing means 31 which may be used to determine the frequencies $f_{un}$ present in the output signal from video scanner means 30. Specifically, the output of video scanner means 30 (of FIG. 6) first may be processed through a high pass filter 32 which is used to filter out the low frequency components resulting from scanning the blocked off central area and area 18 of record 15 (see FIG. 3C).

The filtered signal then may be controlled by threshold control means 33 to allow only those signal components above a certain threshold or minimum amplitude level to pass. When the photointerpretation system embodiment of FIG. 7 is used to accomplish shape recognition, this minimum level preferably should be adjusted so that the signal components resulting from scanning of intense fringes 16 and corresponding to frequencies $f_{um}$ are allowed to pass, but the signal components resulting from scanning lighter dispersed spatial modulation fringes 19 are rejected.

As indicated in FIG. 7, the output of threshold means 33 is a signal whose frequency components $f_{un}$ determine the locations of targets of interest 13 is the photograph 12 being evaluated. To measure these frequencies, spectrum analyzer 40 is employed. Spectrum analyzer 40 may be of the type available commercially, such as the PS-19 Panoramic Spectrum Analyzer manufactured by the Singer Metrics Corp., of Bridgeport, Conn. Alternately, spectrum analyzer 40 may be of the general configuration illustrated by the embodiments of FIG. 8 or 10, and described below. In either case, spectrum analyzer means 30 should be capable of resolving signals up to a highest frequency commonly expected, which is quantitatively determinable by the geometry of the optical arrangement used and the horizontal sweep rate of video scanning means 30. The output of spectrum analyzer 40 can be presented on any appropriate display means 34 such as, for example, an oscilloscope or a numeric printout device.

The construction and arrangement of filter 32, threshold control means 33 and display means 34 are well understood in the art. Accordingly, these elements are shown in block diagram form in FIG. 7 for convenience of exposition.

The procedure just described will allow determination of the position of targets of interest 13 along an axis parallel to direction of video scanning. Thus, as described above, if video scanning means 30 were oriented with its horizontal sweep parallel to the *u*-axis of the output focal plane of lens 3 in FIG. 6A, the detected frequencies $f_{un}$ represent the *x*-axis coordinates of targets of interest 13. To obtain the *y*-axis coordinates of the targets of interest 13, video scanner means 30 may be rotated so that its "horizontal" sweep is parallel to the *v*-axis (as shown, e.g., in FIG. 6A). A new set of frequencies $f_{vn}$ then will be present in the output from video scanner means 30. These frequencies are related to the *v*-axis spacing $\lambda_{vn}$ of fringes 16 in record 15 (see FIG. 3C) by the equation $$f_{vn} = \frac{\text{"horizontal" sweep speed (parallel to the } v\text{-axis)}}{\lambda_{vn}}$$

(4)

The frequencies $f_{vn}$ represent the *y*-axis coordinates of targets of interest 13 in the photograph 12 being evaluated.

Alternately, other techniques well known to those skilled in the art may be employed to recover the frequencies related to the vertical fringe spacing $\lambda_{vn}$ without requiring rotation of video scanning means 30.

The oscilloscopic presentations of FIGS. 3E and 3F are typical of those which would be obtained when using the embodiment of the photointerpretation system shown in FIGS. 6A and 7. Specifically, if this system were used to determine whether the photograph 12 shown in FIG. 3B contained images of identical appearance to reference shape 11 in transparency 10 of FIG. 3A, and the output of spectrum analyzer 40 were displayed on an oscilloscope (one possible embodiment of display means 34), spectral distributions such as those illustrated in FIGS. 3E and 3F would be obtained.

FIG. 3E assumes that video scanning is being accomplished parallel to the *u*-axis, as shown in FIG. 6A, while FIG. 3F assumes scanning parallel to the *v*-axis. Note that since the two targets of interest 13 in FIG. 3B have an *x*-axis separation greater than the *y*-axis separation (assuming the *x*-axis parallel to the bottom edge of FIG. 3B), the frequency separation $f_{u2}-f_{u1}$ (see FIG. 3E) is greater than that of $f_{v2}-f_{v1}$ (see FIG. 3F). The actual frequencies $f_{u1}$, $f_{u2}$, $f_{v1}$, and $f_{v2}$ shown in displays of FIGS. 3E and 3F may be correlated with the absolute locations of the targets in interest 13 via Equations 1 through 4 and the geometry of the optical system used.

To accomplish shape recognition using the photointerpretation system embodiment shown in FIG. 6A and FIG. 7 when the targets of interest 13 have an angular orientation different from that of the reference shape 11 requires separately scanning the Fraunhofer interference image 15 while transparency 10 containing the reference image is rotated incrementally through 360° with respect to transparency 12. Similarly, if the target of interest 13 is of a different size or scale than the reference shape 11, an optical system such as that illustrated in FIG. 4 may be incorporated in the arrangement of FIG. 6 in place of the optical system shown therein. Using that arrangement, successive scans may be performed while the reference image 10 is moved to various positions along optical axis 62, as described above in conjunction with FIG. 4.

FIG. 8 shows a block diagram of another embodiment of the frequency analyzing means 31 of FIG. 6A, including a possible embodiment of spectrum analyzer 40. Specifically, there is shown a voltage controlled local oscillator 41 the frequency of which may be adjusted or varied either smoothly or incrementally over the frquency range in which signals are expected from video scanning means 30, in response to a control voltage input from voltage control means 42. While not required, this frequency variation could be synchronized with the frame time of video scanning means 30. Were this done, voltage control means 42 would use a frame timing signal from video scanning means 30 synchronously to cause oscillator 41 to increase (or decrease) frequency by an incremental amount $df$ each time a complete frame or multiple thereof has been scanned. FIG. 9 shows a time history of the output frequency of oscillator 41 when using such a synchronization scheme.

Referring again to FIG. 8, the output of oscillator 41 is combined in mixer 43 with the output signal from video scanning means 30, which output signal may, if desired, be processed by high pass filter 32 and threshold control means 33 previously described. The difference frequency output of mixer 43 then is processed by a bandpass filter 44.

An output from filter 44 is obtained whenever the output signal from video scanning means 30 contains a component whose frequency differs from that of oscillator 41 by less than the bandwith of bandpass filter 44. This filter output signal is detected by detector means 45 and used to provide a signal to display means 34 which is indicative of the amplitude of a frequency component determined to be present in the output of video scanning means 30. A second signal to display means 34, indicative of $f_n$, the frequency of a component found to be present in the output signal of video scanning means 30, is obtained from oscillator 41.

Optionally, the output of detector means 45 could be integrated by integrator means 46 over some period of time. For example, if voltage control means 42 were synchronized with the frame timing of video scanning means 30, the integration could take place over some multiple of the frame time. Since fringes 16 are present over most of record 15 (see FIG. 3C), such integration would allow frequency analyzing means 31 to analyze the fringe pattern over the entire record, resulting in maximum sensitivity.

Recalling that the location of a target of interest 13 in the photograph being evaluated 12 (see FIG. 3B) is determined from the frequency measured by frequency analyzing means 31, it is to be appreciated that the accuracy with which a target can be located depends on how precisely the frequency is determined. Were the embodiment of frequency analyzing means 31 shown in FIG. 8 employed, such precision would be a function of the incremental step size $df$ of oscillator 41 (see FIG. 9) and of the bandwidth of bandpass filter 43. By providing adjustments for these two parameters, the shape recognition capability of the subject system can be controlled to suit various use requirements, and to obtain successful shape recognition when analyzing photographs containing clutter or objects which partially obscure the targets of interest.

Another factor which effects the accuracy with which a target can be detected is the portion of record 15 which is analyzed for spatial frequency content. Suppose two targets are present at the same *x*-axis location in the photograph being evaluated, one identical to, and the other slightly different in shape from, the reference shape 11 being sought. Both targets will yield fringes 16 having the same spacing in the *u*-axis of record 15 and hence, identical output frequency $f_{un}$ from video scanning means 30.

Since the two targets are slightly different from each other, this will result in two sets of less intense fringes 19 having different amplitude/frequency characteristics. The scanning of these fringes sets will result in output signal components from video scanning means 30 having different amplitudes at some frequency above or below $f_{un}$. This phenomenon is analogous to the lack of spectral symmetry which results when two like photographs are compared for differences. The signal component with the highest amplitude components corresponds to the desired target 13.

Recall that fringes 16 are most intense at regions 18 (see FIG. 3C), and that these regions 18 generally are near the center of record 15. If the size of optical stop 8 is increased to block out regions 18, the amplitude of the $f_{un}$ component of the output signal from video scanning means 30 will be considerably reduced. It will be appreciated that the low amplitude signals resulting from scanning of less intense fringes 19 then more easily can be determined, since frequency analyzing means 31 will not have as a simultaneous input the relatively higher amplitude signals which result from scanning fringes 16. Note that threshold control means 33 may then be altered to permit passage of the lower amplitude signals corresponding to fringes 19, analysis of which signals allows discrimination between the target of interest 13 and other objects in the photograph 12 being evaluated which differ only slightly from the reference shape 11.

Blocking of the areas 18 in record 15 may be accomplished by using an optical stop 8 (see FIG. 6) of sufficiently large size to cover these areas 18. Alternately, scanning of areas 18 may be prevented by utilizing appropriate electronic blanking techniques, well known to those skilled in the art, in conjunction with video scanning means 30.

An alternate embodiment of frequency analyzer means 31, which may be employed as a component of the photointerpretation system shown in FIG. 6A, is shown in the block diagram of FIG. 9. The system of FIG. 9 includes an embodiment of spectrum analyzer 40' which facilitates simultaneous determination of a number of different frequency components present in the output signal of video scanning means 30.

As shown in FIG. 9, the output signal from video scanning means 30, which, if desired, may be processed by high pass filter 32 and threshold control means 33 described above, provides one input to mixer 43'. A second input to mixer 43' is the output of a fixed frequency oscillator 41', at consistent frequency $f_c$. If frequency components $f_1, f_2 \ldots f_i$ are present in the output signal from video scanning means 30, then the difference frequency output of mixer 43' will contain signals at frequencies $f_c-f_1, f_c-f_2 \ldots f_c-f_i$.

A plurality of bandpass filters 44a, 44b . . . 44m are used to separate the frequency components present from mixer 43'. These bandpass filters are selected to have passbands which are contiguous to each other, e.g., the first filter may cover the frequency range 1 mc. to 2 mc., the next 2 mc. to 3 mc., the next 3 mc. to 4 mc., etc. It is not necessary that each bandpass filter have the same bandwidth. Detector means 45a, 45b . . . 45m detect any signals present within the passband of their associated bandpass filters 44a, 44b . . . 44m and provide corresponding outputs to display means 34. Integrator means, not shown, could be provided to cooperate with each detector to integrate over some period of time, e.g., a multiple of the frame time of video scanning means 30, the signals present from each bandpass filter.

Hence, it is to be appreciated that the electronic system of FIGS. 6A and 7 provide means for identifying a selected reference shape in a random spatial distribution or photograph to be evaluated. When, however, two photographs are to be compared for differences, the photointerpretation system of FIG. 6A again may be used, however now the frequency analyzing means 31 preferably may comprise the alternate arrangement shown in FIG. 11.

Referring now to FIG. 11, there are provided elements 30, 32, 33, 40 and 34 all constructed, arranged, and cooperatively interconnected as described above in connection with FIGS. 6A and 7. There is additionally provided spectrum symmetry determination means 50.

In normal operation of the device of FIG. 11, a search first is made using spectrum analyzer 40 and threshold control means 33 to determine the frequency $f_0$ of the maximum amplitude component present in the output signal from video scanner means 30. This component corresponds to the frequency which, were shape recognition being carried out, would locate a target of interest 14 in the photograph being evaluated.

Next a determination is made of the symmetry of other lower amplitude components (corresponding to sets of fringes 19) present in the output signal of video scanning means 30 at frequencies above and below $f_0$. That is, a comparison is made of the amplitude of frequency components found to be present at frequencies $f_0+\Delta f$ and $f_0-\Delta f$, where $\Delta f$ is some increment frequency.

To accomplish this, the output of spectrum analyzer 40 is used, in conjunction with voltage control means 51a and 51b to set to $f_0$ the initial frequency of voltage controlled oscillators 52a and 52b. Subsequently, oscillators 52a and 52b respectively are programmed to decrease and increase in frequency, either smoothly or incrementally, at identical rates to produce outputs at frequencies $f_0-\Delta f$ and $f_0+\Delta f$ respectively. Alternately, a single oscillator and respective upper and lower single sideband means could be employed to obtain outputs at $f_0+\Delta f$ and $f_0-\Delta f$. These upper and lower sideband signals are applied as local oscillator inputs to respective ones of two mixers 53a and 53b.

The output signal from video scanner means 30, after being processed by high pass filter 32 commonly is coupled as a second input to each of mixers 53a and 53b by threshold control means 33'. Threshold control means 33' is set to allow passage of signals of lower amplitude than passed by threshold control means 33, so as to allow those signal components resulting from the scanning of interference fringes 19 to be examined for symmetry.

The outputs of mixers 53a and 53b are processed by bandpass filters 54a and 54b respectively. Again, the size of the frequency increments of oscillators 52a and 52b, and the bandwidth of filters 54a and 54b determine the preciseness to which the components of the video scanning means 30 output signal can be resolved.

The detected differences between signals from bandpass filters 54a and 54b is determined by amplitude difference detecting means comprising elements 55a and 55b and comparison means 56. Comparison means 56 may comprise a differential amplifier for comparing the amplitude of a signal detected at $f_0-\Delta f$, as obtained from detector 55a, with that of a like detected signal at $f_0+\Delta f$ from detector 55b for providing an output indicative of the amplitude and sense of the difference therebetween. Alternately, detector means 55a and 55b may be oppositely poled, and comparison means 56 may comprise signal summing means. The output of comparison means 56 is indicative of the symmetry of the frequency components present. This signal may be displayed, for example, as an oscilloscopic presentation, by display means 34.

Should the compared photographs 10' and 12' be identical, the system just described will indicate exact symmetry of the spatial frequencies comprising record 20'. That is, signal of equal amplitude will be present at frequencies $f_0+\Delta f$ and $f_0-\Delta f$. Should differences be present between the two compared spatial distributions, this will be indicated by a lack of symmetry in the spatial frequencies present in record 20', and signals having different amplitudes will be detected at $f_0+\Delta f$ and $f_0+\Delta f$.

The various electronic elements utilized in the embodiments of frequency analyzing means 31 shown in FIGS. 8, 10 and 11 each are well known to those skilled in the art. Accordingly, these elements have been shown in block diagram form only for ease in exposition.

It is to be understood that the above described arrangements are illustrative of the applications of the principles of the invention. Numerous other arrangements may be devised by those skilled in the art without departing from the spirit and scope of the invention.

What I claim is:
1. A photointerpretation system for comparing a first transparency with a reference transparency, comprising in combination:
  coherent illumination means for mutually projecting images of said transparencies;
  optical transforming means concomitantly illuminated by said coherent illumination means;
  video scanning means for recording interference patterns produced at the output focal plane of said optical transforming means by the combination of said mutually projected images and for providing an output signal indicative of said recorded interference patterns;

frequency analyzing means responsive to the output signal of said video scanning means for determining the presence therein of a preselected range of frequencies; and synchronizing means cooperating with said frequency analyzing means to limit the range of frequencies analyzed during each frame time or multiple thereof of said video scanning means.

2. A photointerpretation system for comparing a first transparency with a reference transparency, comprising in combination:

coherent illumination means for mutually projecting images of said transparencies;

optical transforming means concomitantly illuminated by said coherent illumination means;

video scanning means for recording interference patterns produced at the output focal plane of said optical transforming means by the combination of said mutually projected images and for providing an output signal indicative of said recorded interference patterns;

frequency analyzing means responsive to the output signal of said video scanning means for determining the presence therein of a preselected range of frequencies; and an optical stop positioned adjacent the optical axis of said optical transforming means and in the output focal plane thereof to limit the intensity of said interference patterns received by said video scanning means.

3. A photointerpretation system for comparing first and second coherently illuminated patterns, comprising:

optical transforming means for mutually coincidentally projecting images of said patterns through a common optical focal plane to produce an interference image;

image recording means located at said focal plane for recording the interference image; and spatial frequency analyzing means responsive to said recorded image, said spatial frequency analyzing means comprised of;

means for determining the symmetry of spatial freqeuncies present in said recorded image; the symmetry being determined with respect to the maximum amplitude component in the spatial frequencies present in said recorded image.

4. A photointerpretation system for comparing a first transparency with a reference transparency, comprising in combination:

coherent illumination means for mutually projecting images of said transparencies;

optical transforming means concomitantly illuminated by said coherent illumination means;

video scanning means for recording interference patterns produced at the output focal plane of said optical transforming means by the combination of said mutually projected images and for providing an output signal indicative of said recorded interference pattern; and frequency analyzing means responsive to the output signal of said video scanning means, said frequency analyzing means comprising symmetry determination means to determine the symmetry of frequencies present in the output signal of said video scanning means with respect to the maximum amplitude component in the output signal from said video scanning means.

5. A photointerpretation system for comparing a first transparency with a reference transparency, comprising in combination:

coherent illumination means for mutually projecting images of said transparencies;

optical transforming means concomitantly illuminated by said coherent illumination means;

video scanning means for recording interference patterns produced at the output focal plane of said optical transforming means by the combination of said mutually projected images and for providing an output signal indicative of said recorded interference patterns; and frequency analyzing means responsive to the output of said video scanning means, said frequency analyzing means comprising a spectrum analyzer and spectrum symmetry determination means cooperating therewith to compare the amplitude of signals present at frequencies $f_0+\Delta f$ and $f_0-\Delta f$, wherein $f_0$ represents a frequency determined by said spectrum analyzer and $\Delta f$ represents an incremental frequency.

References Cited

UNITED STATES PATENTS

| | | |
|---|---|---|
| 3,240,108 | 3/1966 | Lehan et al. |
| 3,388,240 | 6/1968 | Robbins. |
| 3,398,269 | 8/1968 | Williams. |
| 3,427,586 | 2/1969 | Lohmann _____ 340—146.3 |
| 3,437,824 | 4/1969 | Lohmann _____ 340—146.3 X |
| 3,363,104 | 1/1968 | Waite et al. |
| 3,425,770 | 2/1969 | Mueller et al. |
| 3,435,244 | 3/1969 | Burckhardt et al. _ 340—146.3 X |

OTHER REFERENCES

Weaver et al., Applied Optics, vol. 5, No. 7, "A Technique for Optically Convolving Two Functions," July 1966, pp. 1248 and 1249.

MAYNARD R. WILBUR, Primary Examiner

L. H. BOUDREAU, Assistant Examiner

U.S. Cl. X.R.

350—3.5